United States Patent [19]

Jinnai et al.

[11] 4,178,595
[45] Dec. 11, 1979

[54] INK JET PRINTING APPARATUS WITH INK REPLENISHING

[75] Inventors: Koichiro Jinnai; Masanori Horike; Kyuhachiro Iwasaki; Yutaka Kodama, all of Tokyo, Japan

[73] Assignee: Ricoh Company, Ltd., Tokyo, Japan

[21] Appl. No.: 956,245

[22] Filed: Oct. 31, 1978

[30] Foreign Application Priority Data

Nov. 4, 1977 [JP] Japan .............................. 52-132378

[51] Int. Cl.$^2$ ............................................. G01D 15/18
[52] U.S. Cl. ................................... 346/140 R; 346/75
[58] Field of Search ............................. 346/75, 140 R

[56] References Cited

U.S. PATENT DOCUMENTS

| 3,930,258 | 12/1975 | Dick et al. ................. 346/140 R X |
| 4,121,222 | 10/1978 | Diebold et al. ............. 346/140 R X |

Primary Examiner—George H. Miller, Jr.
Attorney, Agent, or Firm—David G. Alexander

[57] ABSTRACT

A first ink tank (17) is attached to a movable ink jet printing head (12) for supplying ink thereto. A second ink tank (28) which is larger than the first ink tank (17) is fixedly mounted at an end of a carriage (19) which supports the printing head (12). After the printing head (12) prints a line, a print end signal causes a sensor (33) to sense the amount of ink in the first ink tank (17). If the amount is low the printing head (12) is moved so that a connector (31) of the first ink tank (17) mates with a connector (29) of the second ink tank (28) and ink is urged to flow from the second ink tank (28) to fill up the first ink tank (17). The amount of ink in the first ink tank (17) is again sensed and if it is still low, indicating that the amount of ink in the second ink tank (28) is also low, an annunciator (41) is energized to urge the apparatus operator to fill the second ink tank (28) with ink.

7 Claims, 3 Drawing Figures

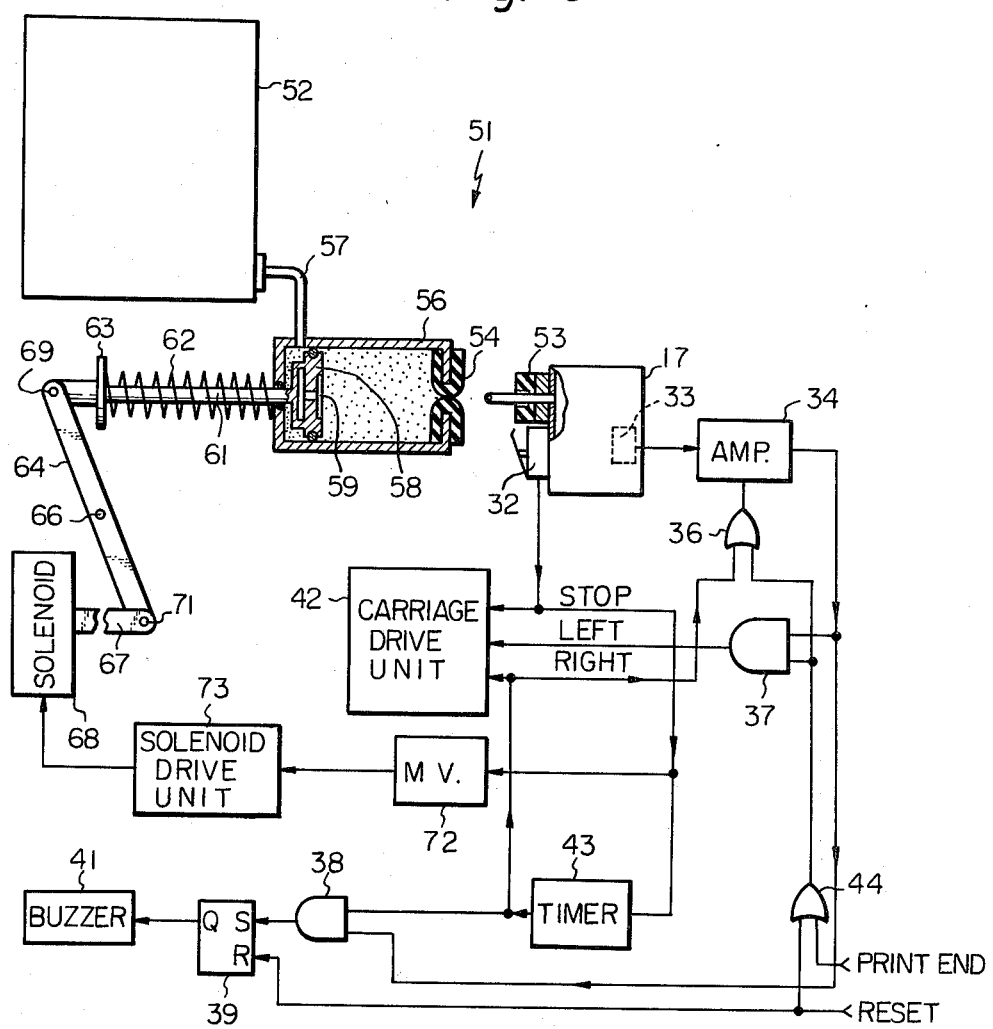

INK JET PRINTING APPARATUS WITH INK REPLENISHING

BACKGROUND OF THE INVENTION

The present invention relates to an ink jet printing apparatus for a data processing system, a facsimile transceiver or the like.

Ink jet printers are becoming increasingly popular due to their high operating speed, print quality, etc. Generally such a printer comprises an ink ejection or ink jet printing head which is moved relative to a sheet of paper. The head is actuated by electrical signals to suitably eject droplets of ink onto the paper to form characters, patterns and the like as desired. The head is moved relative to the paper in an orthogonal scanning pattern which covers the entire surface of the paper.

An ink tank of necessarily small size is attached to the head for supplying ink thereto. A larger ink tank is mounted in a stationary position at an end of a carriage which supports the head for reciprocating movement for periodically supplying ink into the small tank. Sensors are attached to both tanks for indicating when the amount of ink therein is low. When the amount of ink in the small tank attached to the head runs low, the first tank is moved into communicating engagement with the large stationary tank and filled therefrom. When the amount of ink in the large tank runs low, an annunciator such as a buzzer is energized to urge the apparatus operator to fill the large tank.

The prior art apparatus described above is disadvantageous in that two sensors are required, one for the small tank and one for the large tank. This unnecessarily increases the complexity and cost of the apparatus.

SUMMARY OF THE INVENTION

An ink jet printing apparatus embodying the present invention includes a movable ink jet printing head, a first ink tank attached to the printing head for supplying ink thereto and a second ink tank separate from the first ink tank. Sensor means sense when an amount of ink in the first ink tank is below a predetermined level and produce a first signal in response thereto. Supply means are actuated by control means in response to the first signal for communicating the second tank with the first tank and urging ink to flow from the second tank into the first tank. Annunciator means produce an indication in response to a second signal. The control means produce the second signal if the first signal is produced by the sensor means after the supply means are actuated by the control means.

It is an object of the present invention to provide an ink jet printing apparatus which operates at increased efficiency over the prior art.

It is another object of the present invention to provide an ink jet printing apparatus which eliminates a sensor means required in prior art apparatus and operates with increased reliability.

It is another object of the present invention to provide an ink jet printing apparatus which comprises fewer parts and therefore may be manufactured at lower cost than comparable prior art apparatus.

It is another object of the present invention to provide a generally improved ink jet printing apparatus.

Other objects, together with the following, are attained in the embodiments described in the following description and shown in the accompanying drawing.

BRIEF DESCRIPTION OF THE DRAWING

FIG. 3 is a block diagram of a second embodiment of the present apparatus.

DESCRIPTION OF THE PREFERRED EMBODIMENTS

While the ink jet printing apparatus of the invention is susceptible of numerous physical embodiments, depending upon the environment and requirements of use, substantial numbers of the herein shown and described embodiments have been made, tested and used, and all have performed in an eminently satisfactory manner.

Figure 1:
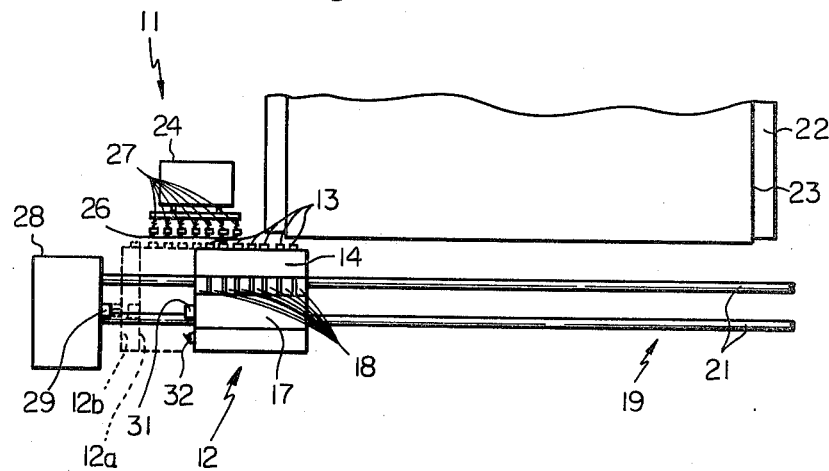
FIG. 1 is a fragmentary plan view of an ink jet printing apparatus embodying the present invention.

Referring now to FIG. 1 of the drawing, an ink jet printing apparatus embodying the present invention is generally designated by the reference numeral 11 and comprises an ink jet or ink ejection printing head 12. The head 12 comprises seven ink ejectors 13 which protrude from a block 14. The ejectors 13 are connected to a first ink tank 17 by tubes 18. The block 14, ejectors 13, tubes 18 and ink tank 17 are attached together in a unitary manner and reciprocatably mounted on a carriage 19 which comprises rails 21. Provided adjacent to the carriage 19 is a platen 22 around which is wound a sheet of paper 23 on which characters and the like are to be printed by the head 12.

The manner in which the apparatus 11 prints characters and the like on the sheet of paper 23 is not the particular subject of the present invention and will not be described in detail. It is sufficient for an understanding of this invention to know that the head 12 is moved from the leftmost solid position shown to a rightmost position (not shown) while electrical pulses are fed to the ejectors 13 in a selective manner. The pulses cause minute drops of ink to be ejected from the ejectors 13 against the paper 23 to print dots. Horizontal scan is effected in this manner. After a line of dots is printed the platen 22 and paper 23 are indexed perpendicular to the direction of movement of the head 12 for vertical scan. The ink is supplied to the ejectors 13 from the ink tank 17.

When not in actual use the head 12 is moved to a broken line position 12a and a closure unit 24 is de-energized to allow caps 26 to be urged into sealing engagement with the ends of the ejectors 13 by springs 27. Energization of the closure unit 24 causes the caps 26 to be moved away from the ejectors 13.

The apparatus 11 further comprises an ink tank 28 which is mounted in a stationary position at the left end of the carriage 19. The tank 28 typically has a much larger capacity than the tank 17. The tank 28 is provided with a male connector 29 which mates with a conjugate female connector 31 provided on the tank 17 when the head 12 is moved to a broken line position 12b to communicate the interior of the tank 28 with the interior of the tank 17. The ink is under pressure in the tank 28. Further illustrated is a limit switch 32 attached to the head 12 and actuated (opened or closed as required) through engagement with the tank 28 when the head 12 is moved to the position 12b.

Figure 2:
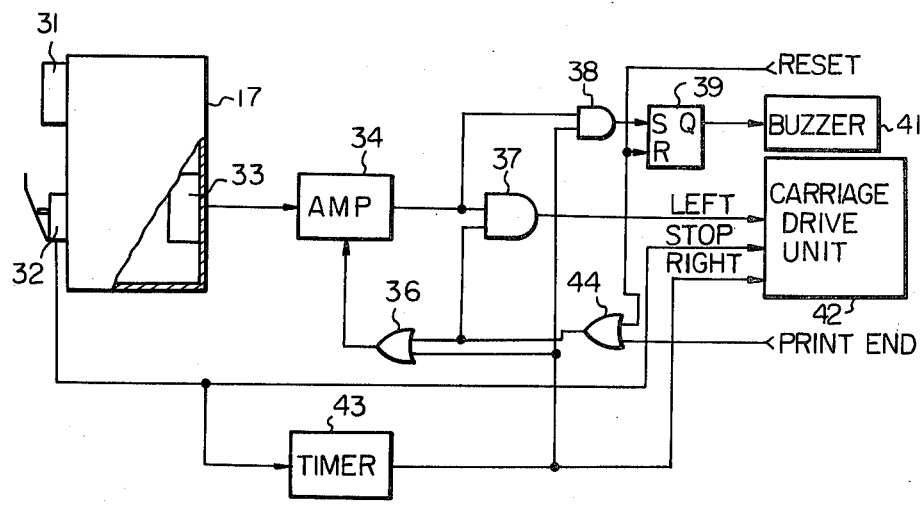
FIG. 2 is a schematic diagram of a first embodiment of the present invention apparatus.

Referring also to FIG. 2, the tank 17 is provided with a sensor 33 to sense when the amount of ink in the tank 17 is below a predetermined level. The sensor 33 may be embodied by any means known in the art such as a switch actuated by a float, an electrode, etc. The sensor 33 has an output connected to an input of an amplifier 34 which is enabled to produce a high output only when the output of the sensor 33 and the output of an OR gate 36 are simultaneously logically high. The output of the amplifier 34 is connected to inputs of AND gates 37 and 38, the output of the AND gate 38 being connected to the set input of a flip-flop 39. The Q output of the flip-flop 39 is connected to an annunciator which is shown as being a buzzer 41 but which may be any other type of audio or visual indicator such as a bell, flashing light or siren.

The output of the AND gate 37 is connected to a control input of a carriage drive unit 42 which controls the movement of the head 12 on the rails 19. A logically high output of the AND gate 37 causes the drive unit 42 to move the printing head 12 leftwardly.

The limit switch 32 is connected to an input of a timer 43 and also to a control input of the carriage drive unit 42. A logically high output signal from the switch 32 causes the drive unit 42 to stop movement of the head 12.

The output of the timer 43 is connected to inputs of the OR gate 36 and the AND gate 38. The output of the timer 43 is also connected to a control input of the carriage drive unit 42 and causes the head 12 to be moved rightwardly when logically high. A print end signal is applied to an input of an OR gate 44, the output of which is connected to inputs of the OR gate 36 and the AND gate 37. A reset signal is applied to the reset input of the flip-flop 39 and an input of the OR gate 44.

In operation, the print end signal is generated when the head 12 is returned to the solid line position after printing one line on the paper 23. The print end signal is gated to the amplifier 34 through the OR gates 44 and 36 and also to the AND gate 37 through the OR gate 44. The high output of the OR gate 36 enables the amplifier 34 which produces a logically low signal if the amount of ink in the tank 17 is above the predetermined level. In this case, the apparatus 11 resumes its normal printing operation for the next line.

However, if the amount of ink in the tank 17 is below the predetermined level, the amplifier 34 will produce a high output signal which is passed through the AND gate 37 to the carriage drive unit 42 causing the head 12 to be moved leftwardly to the position 12b. In this position the connectors 29 and 31 mate thereby establishing communication between the tanks 17 and 28 and the switch 32 is actuated. Actuation of the switch 32 causes the carriage drive unit 42 to stop movement of the head 12 in the position 12b and also triggers the timer 43. The timer 43 is constructed in any known manner to produce a high output signal after a predetermined length of time has elapsed which is sufficient for ink from the tank 28 to fill the tank 17. When the timer 43 times out, it produces a high signal which causes the carriage drive unit 42 to move the head 12 rightwardly to the solid line position. The high output signal from the timer 43 also enables the amplifier 34 and AND gate 38.

If sufficient ink has flowed from the tank 28 into the tank 17 to increase the amount of ink in the tank 17 above the predetermined level, the amplifier 34 will produce a low output and the normal operation of the apparatus (printing the next line) will be initiated. However, if there is insufficient ink in the tank 28 to fill the tank 17, the amplifier 34 will produce a high output which is gated through the AND gate 38 to set the flip-flop 39. The high Q output of the flip-flop 39 energizes the buzzer 41 to urge the apparatus operator to fill the tank 28 with more ink. The high Q output of the flip-flop 39 may also cause the operation of the apparatus 11 to be interrupted through circuitry which is not shown.

After the apparatus operator fills the tank 28 with more ink, he presses a reset button (not shown) which causes generation of the reset signal. The reset signal resets the flip-flop 39 to de-energize the buzzer 41 and is also gated through the OR gates 44 and 36 to the amplifier 34 to enable the same. The reset signal is also gated through the OR gate 44 to the AND gate 37 to enable the same. The reset signal has exactly the same effect as the print end signal and causes another sensing operation of the amount of ink in the tank 17. It will be understood that, although the apparatus operator filled the tank 28, the tank 17 is still empty. Thus the amplifier 34 produces a high signal which causes the carriage drive unit 42 to move the head leftwardly into communicating engagement with the tank 28. Thus, fresh ink from the tank 28 is caused to flow by pressure in the tank 28 into the tank 17 to fill the same. When the timer 43 times out, the amplifier 34 will be enabled but will produce a low output since the tank 17 has been filled. Then, the normal operation of the apparatus 11 will be initiated.

It will be understood that the sensor 33 functions to sense for insufficient ink in both tanks 28 and 17 and replaces the two sensors which are required in the prior art. The amount of ink in the tank 17 is first sensed and, if insufficient, the tanks 28 and 17 are connected for filling the tank 17 from the tank 28. However, if the amount of ink in the tank 28 is insufficient to fill the tank 17, the sensor 33 will still produce a high output after the filling operation. This will energize the buzzer 41. However, if enough ink was in the tank 28 to fill the tank 17, the sensor 33 will produce a low output and the normal operation of the apparatus 11 will be resumed.

FIG. 3 illustrates another apparatus 51 of the present invention which comprises a tank 52 which replaces the tank 28 and is not pressurized. Like elements are designated by the same reference numerals used in FIGS. 1 and 2.

In the apparatus 51 the tank 17 is provided with a male, rather than a female connector which is designated as 53. In the position 12b the connector 53 mates with a female connector 54 and thereby communicates with the interior of a cylinder 56. The cylinder 56 communicates with the tank 52 through a conduit 57 at the left end of the cylinder 56. A piston 58 is sealingly reciprocatable in the cylinder 56 and provided with a check valve 59 which allows ink flow only in the rightward direction through the piston 58. A rod 61 is connected to the left end of the piston 58 and extends externally through the left end of the cylinder 56. A compression spring 62 urges the rod 61 and piston 58 leftwardly by means of a spring seat 63 fixed to the rod 61.

A lever 64 is pivotally supported about a fulcrum pin 66 and pivotally connected at one end to the left end of the rod 61 by means of a pin 69. The other end of the lever 64 is pivotally connected to a rod 67 of an electrical solenoid 68 by means of a pin 71.

The switch 32 is connected to an input of a monostable multivibrator 72, the output of which is connected to an input of a solenoid drive unit 73. The output of the solenoid drive unit 73 is connected to energize the solenoid 68 when logically high.

The operation of the apparatus 51 is the same as that of the apparatus 11 except as will be described below.

Ink from the tank 52 flows into the cylinder 56 through the conduit 57 and check valve 59 to fill the same due to gravity. The piston 58 is normally maintained in the leftmost position shown due to the action of the spring 62.

Actuation of the switch 32 triggers the multivibrator 72 which produces a high output for a predetermined length of time. This high output energizes the solenoid drive unit 73 which in turn energizes the solenoid 68. Energization of the solenoid 68 causes the rod 67 to be moved leftwardly and the lever 64 to pivot clockwise about the pin 66. This causes the rod 61 and piston 58 to move rightwardly, thereby displacing ink from the cylinder 56 into the tank 17. In this case the check valve 59 closes and blocks reverse flow through the piston 58. The ink injected into the tank 17 from the cylinder 56 will fill the same if there was enough ink in the tank 52 to fill the cylinder 56. The pulse duration of the multivibrator 72 is selected to be just long enough for the piston 58 to make one complete rightward reciprocation. Thereafter, the piston 58 and rod 61 are moved leftwardly by the spring 62 to the illustrated position. After this filling operation the amount of ink in the tank 17 is sensed in the same manner as described above for the apparatus 11. The apparatus 51 is advantageous in that it eliminates the need for a pressure source for the tank 28.

Various modification will become possible for those skilled in the art after receiving the teachings of the present disclosure without departing from the scope thereof. For example, in the apparatus 51 the cylinder 56 may be selected to have a small volume compared to the tank 17 and the piston 58 reciprocated several times to fill the tank 17. The print end signal may be generated at the right limit of travel of the head 12 rather than at the solid line position or may be replaced by any other suitable signal which is produced during the operation of the apparatus 11.

With sensing means being considered to include the sensor 33 and amplifier 34, the sensing means may be enabled continuously and a filling operation be initiated at any time the sensing means produces a high output. The operation of the apparatus 11 may be immediately interrupted for the filling operation or the interruption of operation delayed until a certain other operation is completed, such as printing a line. It is also possible to movably mount the tank 28 or cylinder 56 and move the same into engagement with the tank 17 rather than vice-versa for filling the tank 17. Of course, it is well within the scope of the present invention to mount the tank 28 at the right end, rather than the left end of the carriage 19 or in any other suitable position.

What is claimed is:

1. An ink jet printing apparatus including a movable ink jet printing head, a first ink tank attached to the printing head for supplying ink thereto and a second ink tank separate from the printing head, characterized by comprising:
   sensor means for sensing when an amount of ink in the first ink tank is below a predetermined level and producing a first signal in response thereto;
   control means;
   supply means actuated by the control means in response to the first signal for communicating the second ink tank with the first ink tank and urging ink to flow from the second ink tank into the first ink tank; and
   annunicator means for producing an indication in response to a second signal;
   the control means producing the second signal when the first signal is produced by the sensor means after the supply means is actuated by the control means.

2. An apparatus as in claim 1, further comprising a first connector attached to the first ink tank and a second connector conjugate to the first connector attached to the second ink tank, the control means producing relative movement between the printing head and the second ink tank so as to cause the first and second connectors to mate in response to the first signal.

3. An apparatus as in claim 1, in which the supply means comprises a cylinder communicating with the second ink tank and being communicatable with the first ink tank and a reciprocatable piston sealingly slidable in the cylinder for displacing ink flowing from the second ink tank into the cylinder from the cylinder into the first ink tank.

4. An apparatus as in claim 3, in which the supply means further comprises an electrical solenoid for reciprocating the piston.

5. An apparatus as in claim 1, in which the control means comprises gate means for enabling the sensor means.

6. An apparatus as in claim 5, in which the gate means is constructed to enable the sensor means in response to a reset signal, the reset signal deenergizing the annunciator means.

7. An apparatus as in claim 5, in which the control means is constructed to control the gate means to enable the sensor means in response to a third signal, actuate the supply means for a predetermined length of time in response to the first signal and enable the sensor means again after the predetermined length of time has elapsed.

* * * * *